United States Patent [19]

Saotome

[11] Patent Number: 4,783,510

[45] Date of Patent: Nov. 8, 1988

[54] PROCESS FOR IMPROVING A WATER ABSORBENT POLYACRYLIC ACID POLYMER AND AN IMPROVED POLYMER PRODUCED BY SAID PROCESS

[75] Inventor: Kazuo Saotome, Tokyo, Japan

[73] Assignee: Taiyo Fishery Co., Ltd., Tokyo, Japan

[21] Appl. No.: 57,193

[22] Filed: Jun. 3, 1987

[30] Foreign Application Priority Data

Jun. 4, 1986 [JP] Japan .................. 61-130560
Feb. 24, 1987 [JP] Japan .................. 62-040834

[51] Int. Cl.$^4$ .............................................. C08F 8/00
[52] U.S. Cl. .................................. 525/329.7; 525/387
[58] Field of Search ........................... 525/329.7, 387

[56] References Cited

U.S. PATENT DOCUMENTS 3,418,066 12/1968 Caldwell et al. ................... 525/387
4,225,650 9/1980 van Brederode et al. .......... 525/387

FOREIGN PATENT DOCUMENTS 1932891 2/1971 Fed. Rep. of Germany .
6870648 6/1977 Japan .
84112688 12/1985 Japan .
737521 3/1982 U.S.S.R. .

Primary Examiner—Joseph L. Schofer
Assistant Examiner—Bernard Lipman
Attorney, Agent, or Firm—Armstrong, Nikaido, Marmelstein & Kubovcik

[57] ABSTRACT

A process for improving a water absorbent polyacrylic acid polymer in which the polymer is contacted with an aqueous solution containing a water soluble peroxide radical initiator, followed by heating, thereby causing substantially only the surface portion of the polymer to undergo crosslinking with the radical initiator while leaving the remaining core portion of the polymer substantially intact. The improved water absorbent polyacrylic acid polymer is excellent in both water absorbency and water absorption rate, and the hydrogel resulting from absorption of water has a pleasant, nonsticky feel. The improved water absorbent polyacrylic acid polymer can be advantageously utilized to produce a desirable disposable diaper, sanitary napkin, surgical pad, surgical sheet, paper towel or the like.

50 Claims, No Drawings

PROCESS FOR IMPROVING A WATER ABSORBENT POLYACRYLIC ACID POLYMER AND AN IMPROVED POLYMER PRODUCED BY SAID PROCESS

This invention relates to a process for improving a water absorbent polyacrylic acid polymer with respect to its absorption characteristics and an improved polymer produced by said process. More particularly, this invention is concerned with a process in which substantially only the surface portion of the water absorbent polyacrylic acid polymer is caused to undergo crosslinking with the aid of a water soluble peroxide radical initiator, while leaving the remaining core portion of the polymer substantially intact, and the improved water absorbent polyacrylic acid polymer produced by this process. The improved water absorbent polyacrylic acid polymer is excellent in water absorption rate, and the hydrogel resulting from the absorption of water has a pleasant non-sticky feel. The improved water absorbent polyacrylic acid polymer which can effectively absorb water, urine, menstrual blood or the like may be subjected to customary procedures thereby to obtain a water absorbent polymer-coated or impregnated article such as a disposable diaper, a sanitary napkin, a surgical pad, a surgical sheet, a paper towel or the like. These products produced using the improved water absorbent polyacrylic acid polymer of the present invention can absorb, for example, water in an amount of several hundred times the weight of the polymer, and are safe to human health.

Various kinds of water absorbent polymers are known in the art. Of them, the predominant polymer is a polyacrylic acid polymer. Examples of the known water absorbent polyacrylic acid polymer are a crosslinked acrylic acid homopolymer, a crosslinked acrylic acid copolymer, a saponification product of a copolymer of vinyl acetate and an acrylic ester, a graft crosslinked polymer of starch and acrylic acid and a hydrolyzate of a graft polymer of starch and acrylonitrile. These polymers may be produced according to many different manufacturing procedures, a summary of which is found in *Yuki Gosei Kagaku* (translation: Organic Synthetic Chemistry), vol. 38, No. 6 (1980), pp 28 to 36. Specifically, for example, a crosslinked acrylic acid homopolymer may be produced by the method of Japanese Patent Application Laid-open Specification No. 53-46389/1978, and a crosslinked acrylic acid copolymer may be produced by the method of Japanese Patent Application Laid-open Specification No. 56-147809/1981. A saponification product of a copolymer of vinyl acetate and an acrylic ester, which is generally not crosslinked, may be produced by the method of Japanese Patent Application Laid-open Specification No. 52-27455/1977. A graft crosslinked polymer of starch and acrylic acid may be produced by the method of Japanese Patent Application Laid-open Specification No. 53-130788/1978. A hydrolyzate of a graft polymer of starch and acrylonitrile, which is generally not crosslinked, may be produced by the method of U.S. Pat. No. 3,981,100. With respect to the above-mentioned copolymers, the acrylic acid content may be varied widely, but is generally about 50% by mole or more.

These water absorbent polyacrylic acid polymers may be classified into a soft gel and a rigid gel in a relative sense. The soft gel generally has a lower crosslinking degree or bonding point density, and can absorb from about 400 to about 1000 g of water per g of the gel. On the other hand, the rigid gel generally has a higher crosslinking degree or bonding point density, and its water absorbency is from about 100 to 400 g of water per g of the gel.

When a soft gel is contacted with water, water absorption and swelling first occur at the surface portion of the gel. This retards further penetration of water into the core portion of the gel. Accordingly, the soft gel is generally disadvantageously low in water absorption rate, as compared with the rigid gel which is less affected by such retardation of water penetration presumably due to the rigid structure of the rigid gel. Retardation of the water absorption rate of the soft gel is especially serious in the case where the soft gel is in the form of particles. That is, when soft gel particles are contacted with water, water absorption and swelling first occur at their surface portion. Then, the soft gel particles are sticky, thereby forming an agglomerate. The formation of an agglomerate of soft gel particles leads to retardation of the water penetration into the inner particles of the agglomerate. This causes the retardation of the water absorption rate to become especially serious.

Recently, proposals have been made to produce a gel having soft gel properties at its inner portion and rigid properties at its surface portion. The purpose of such proposals is to obtain a gel having the advantage of the soft gel which is capability of absorbing a large amount of water and the advantage of the rigid gel which is capability of exhibiting a high water absorption rate and a pleasant non-sticky feel.

Processes for obtaining the above-mentioned advantageous gel have been proposed in Japanese Patent Application Laid-open Specification Nos. 56-31608/1981, 57-44627/1982, 58-42602/1983, 5817222/1983, 59-62665/1984 and 59-189103/1984. Each of the processes disclosed in these patent application specifications comprises effecting crosslinking of the polymer molecules at the surface portion of a soft gel by the reaction between the carboxyl or carboxylate group of the polymer and the functional group of a crosslinking agent. Examples of the crosslinking agent mentioned in these patent application specifications are polyglycidyl compounds such as ethylene glycol diglycidyl ether, propylene glycol diglycidyl ether and glycerine diglycidyl ether, haloepoxy compounds such as epichlorohydrin and epibromohydrin, isocyanate compounds such as hexamethylene diisocyanate or the like. All of these crosslinking agents irritate the human skin, and are harmful to human health. Since the water absorbent gel is used to produce a disposable diaper, a sanitary napkin, a surgical pad, a surgical sheet, a paper towel or the like, it is needed to thoroughly remove the unreacted crosslinking agents from the gel. However, thorough removal of the crosslinking agents is difficult, and some quantity of the harmful agents tends to remain in the gel. This limits the application of the processes of the above-mentioned patent applications. Moreover, these processes are disadvantageous in that they utilize a time-consuming crosslinking reaction and that the improvement attained by these processes is not sufficient.

The present inventor has made extensive and intensive studies with a view to developing a desirable water absorbent gel having soft gel properties at its inner portion and rigid gel properties at its surface portion, which gel is free from the above-mentioned drawbacks of the prior art. As a result, it has unexpectedly been found that the desired improvement of a water absorbent polyacrylic acid polymer gel can be attained by incorporating an aqueous solution containing a water soluble peroxide radical initiator into substantially only the surface portion of the gel while leaving the remaining core portion of the gel substantially intact, and decomposing the radical initiator. Based on this unexpected finding, the present invention has been completed.

It is, therefore, an object of the present invention to provide a novel process for improving a water absorbent polyacrylic acid polymer, which process can be advantageously employed to obtain a gel exhibiting an excellent water absorbency and an excellent water absorption rate and converted to a hydrogel having a pleasant non-sticky feel and not irritating the human skin.

It is another object of the present invention to provide the above-mentioned desirably improved water absorbent polyacrylic acid polymer.

The foregoing and other objects, features and advantages of the present invention will be apparent to those skilled in the art from the following detailed description and appended claims.

In one aspect of the present invention there is provided a process for improving a water absorbent polyacrylic acid polymer with respect to absorption characteristics thereof which comprises the steps of:

(1) contacting with the surface of a water absorbent polyacrylic acid polymer an aqueous solution containing a water soluble peroxide radical initiator, the weight ratio of the water in said aqueous solution to said polymer being from 0.01 to 0.5, thereby causing said polymer substantially only at its surface portion to have said solution absorbed therein; and (2) heating the resulting polymer with its surface portion having said solution absorbed therein at a temperature such that said initiator is decomposed but said polymer is not decomposed, thereby causing said polymer at its surface portion to undergo crosslinking by the action of said initiator while leaving the remaining core portion of said polymer substantially intact.

In the process of the present invention, an aqueous solution containing a water soluble peroxide radical initiator is contacted with the surface of a water absorbent polyacrylic acid polymer at a weight ratio of the water in the aqueous solution to the polymer of from 0.01 to 0.5. From the viewpoint that the polyacrylic acid polymer to be employed in the present invention can absorb about several hundred parts by weight or more of water per part by weight of the polymer, it is apparent that contacting an aqueous solution with the polymer in the above-mentioned weight ratio leads to occurrence of the aqueous solution absorption and swelling of the polymer at substantially only the surface portion thereof without penetration of the aqueous solution into the core portion of the polymer.

In the process of the present invention, the above-mentioned weight ratio is in the range of generally from 0.01 to 0.5, preferably from 0.02 to 0.3, more preferably from 0.02 to 0.2, most preferably from 0.03 to 0.1. The water acts as a medium for carrying the peroxide radical initiator into the surface portion of the polyacrylic acid polymer. Besides this, the water is needed to ensure crosslinking of polymer molecules by the action of the peroxide radical initiator. When the above-mentioned ratio is less than 0.01, such crosslinking of polymer molecules becomes difficult, thereby causing attainment of the desired improvement of the polyacrylic acid polymer to become difficult. On the other hand, when the above-mentoned ratio is more than 0.5, penetration of the aqueous solution containing a peroxide radical initiator into the polymer becomes excess, so that the desired polymer which is crosslinked by the action of the radical initiator substantially only at its surface portion cannot be obtained.

The kind of the water absorbent polyacrylic acid polymer to be employed in the process of the present invention is not critical, and any of the water absorbent polyacrylic acid polymers set forth hereinbefore may be employed in the process of the present invention.

In the process of the present invention, 60 to 90% by mole of the carboxyl groups of the water absorbent polyacrylic acid polymer may be in the form of an alkali metal salt selected from a lithium salt, a sodium salt and a potassium salt.

When the water absorbent polyacrylic acid polymer to be employed in the present invention is a copolymer, the acrylic (i.e. acrylic acid plus acrylic salt, if any) monomeric unit content of the polymer is not critical, but it may be preferred that the content be 50% by mole or more. The water absorbent polyacrylic acid polymer may be a gel capable of absorbing from 300 to 1000 g of water per g of the polymer.

The shape of the water absorbent polyacrylic acid polymer is not critical. However, it may be preferred that the polymer be in a particulate form, fibrous form or film form. When the polyacrylic acid polymer is in a particulate form, the average particle diameter of the polymer may be in the range of generally from 10 to 3000 $\mu$m, preferably from 50 to 1000 $\mu$m, more preferably from 100 to 500 $\mu$m. When the polyacrylic acid polymer is in a film form, the thickness of the polymer may be in the range of generally from 5 to 1000 $\mu$m, preferably from 10 to 500 $\mu$m, more preferably from 20 to 100 $\mu$m. When the polyacrylic acid polymer is in a fibrous form, the diameter of the polymer may be in the range of generally from 5 to 1000 $\mu$m, preferably from 10 to 100 $\mu$m.

The water absorbent polyacrylic acid polymer which is commercially available on the market generally has a moisture content of from 4 to 8% by weight. This polymer as it is can be used, without being subjected to a drying operation, in the process of the present invention, so far as the weight ratio of the water in the aqueous solution to the polymer is maintained at a value of from 0.01 to 0.5.

As the water soluble peroxide radical initiator to be employed in the present invention for the purpose of effecting crosslinking at the surface portion of a water absorbent polyacrylic acid polymer, there may be mentioned, for example, persulfate salts such as ammonium persulfate, sodium persulfate and potassium persulfate, inorganic compounds such as hydrogen peroxide, and organic compounds such as oxalic acid peroxide, acetic acid peroxide and succinic acid peroxide. From the viewpoints of the decomposition temperature, crosslinking efficiency and cost of the initiator, ammonium persulfate and potassium persulfate are most preferred.

The water soluble peroxide radical initiator is incorporated in the aqueous solution in an amount sufficient to crosslink the water absorbent polyacrylic acid polymer and in such an amount that the water dissolves the initiator therein. The radical initiator may be incorporated in the aqueous solution in an amount of generally from 0.01 to 10% by weight, preferably from 0.1 to 5% by weight, more preferably from 0.2 to 2% by weight based on the polymer. When the amount of the peroxide radical initiator is less than 0.1% by weight based on the polymer, desirable crosslinking of polymer molecules does not occur. On the other hand, when the amount of the peroxide radical initiator is more than 10% by weight based on the polymer, excess crosslinking of polymer molecules occurs, thereby causing the water absorbency of the polymer to become poor.

In the process of the present invention, a water miscible volatile organic solvent such as methanol, ethanol, acetone, methyl ethyl ketone or the like may be added to the aqueous solution of the peroxide radical initiator for the purpose of attaining uniform penetration of the aqueous solution into the surface portion of the polyacrylic acid polymer, especially when the amount of the water is small. Since the water miscible volatile organic solvent is usually evaporated immediately upon the above-mentioned uniform penetration of the aqueous solution, the amount of the organic solvent added is not critical. However, it is generally in the range of from 0.5 to 10 parts by volume, preferably from 1 to 5 parts by volume, per part by volume of water. Further, a polyvalent alcoholic compound such as ethylene glycol, propylene glycol and glycerine may be added to the aqueous solution as a plasticizer for the purpose of rendering the ultimate water absorbent polyacrylic acid polymer flexible especially in the case of a film form or a fibrous form.

Moreover, a crosslinking auxiliary may be added to the aqueous solution of the peroxide radical initiator in an amount of from 0.01 to 10% by weight based on the polymer for the purpose of promoting the crosslinking of polyacrylic acid polymer molecules by the action of the peroxide radical initiator. As the suitable crosslinking auxiliary, there may be mentioned, for example, N,N'-methylenebisacrylamide, ethylene glycol bis(meth)acrylate, polyethylene glycol bis(meth)acrylate and other hydrophilic polyfunctional olefinically unsaturated compounds.

The method of contacting the aqueous solution containing the peroxide radical initiator with the surface of the water absorbent polyacrylic acid polymer is not critical. However, it is generally preferred that the aqueous solution be sprayed onto the surface of the polymer under agitation. Also, it is generally convenient to conduct contacting of the aqueous solution with the surface of the polymer at about room temperature.

In the process of the present invention, the water absorbent polyacrylic acid polymer with its surface portion having the aqueous solution containing the water soluble peroxide radical initiator absorbed therein is heated at a temperature at which the initiator is decomposed but the polyacrylic acid polymer is not decomposed. This temperature may be in the range of generally from $(T-30)°$ C. to $(T+50)°$ C., preferably from $(T-20)°$ C. to $(T+30)°$ C., more preferably from $(T-10)°$ C. to $(T+20)°$ C., wherein T represents the temperature at which the half amount of the peroxide radical initiator is decomposed within a minute. For example, when the initiator is ammonium persulfate, T is about 120° C.

The above-mentioned heating to effect crosslinking of polymer molecules at substantially only the surface portion of the polyacrylic acid polymer while leaving the remaining core portion of the polymer substantially intact is generally completed within 10 min. The method of conducting this heating is not critical. However, it is generally preferred that this heating be conducted in an atmosphere of superheated steam. After completion of the heating for effecting crosslinking of polymer molecules, the heating may be continued to dry the product.

By the above-described process of the present invention, a water absorbent polyacrylic acid polymer improved with respect to absorption characteristics thereof is produced. Accordingly, in another aspect of the present invention, there is provided an improved water absorbent polyacrylic acid polymer produced by a process comprising the steps of:

(1) contacting with the surface of a water absorbent polyacrylic acid polymer an aqueous solution containing a water soluble peroxide radical initiator, the weight ratio of the water in said aqueous solution to said polymer being from 0.01 to 0.5, thereby causing said polymer substantially only at its surface portion to have said solution absorbed therein; and (2) heating the resulting polymer with its surface portion having said solution absorbed therein at a temperature such that said initiator is decomposed but said polymer is not decomposed, thereby causing said polymer at its surface portion to undergo crosslinking by the action of said initiator while leaving the remaining core portion of said polymer substantially intact.

The improved water absorbent polyacrylic acid polymer of the present invention is excellent in both water absorbency and water absorption rate, and the hydrogel resulting from absorption of water has a pleasant non-sticky feel. The polymer does not irritate the human skin and is safe to human health. Therefore, the improved water absorbent polyacrylic acid polymer of the present invention can be advantageously utilized to produce a desirable disposable diaper, sanitary napkin, surgical pad, surgical sheet, paper towel or the like.

The present invention will be illustrated in more detail with reference to the following Examples, which should not be construed to be limiting the scope of the present invention.

EXAMPLE 1 AND COMPARATIVE EXAMPLE

To a mixture of 66.6 parts by weight of a 48% by weight aqueous solution of sodium hydroxide, 72 parts by weight of acrylic acid and 85 parts by weight of purified water were added 0.08 part by weight of N,N'-methylene-bisacrylamide and 0.1 part by weight of potassium persulfate to prepare an aqueous solution. The aqueous solution was placed in a container so that the solution formed a layer having a thickness of about 1 cm. Under a stream of nitrogen gas, the aqueous solution was heated to about 50° C. to initiate polymerization of the acrylic acid in a sodium salt from. Since the polymerization is an exothermic reaction, the container was cooled to prevent the temperature of the reaction mixture from exceeding about 80° C. The polymerization reaction was continued for 10 min to obtain a rubbery polymer product. The product was dried at 100° C. for 3 hr in a vacuum chamber and pulverized into a powdery product. The powdery product was sifted with a sieve to obtain a powdery product [Sample A (comparative)] having an average particle diameter of 32 to 200 mesh (Tyler). The Sample A was subjected to the absorbency measuring test as indicated below.

MEASUREMENT OF ABSORBENCY 0.5 g of the obtained powdery polymer product was separately put in 1000 ml of purified water and 100 ml of 0.9% saline solution (physiological saline solution), and 60 minutes later the formed hydrogel was sifted with a 80-mesh metal sieve and subjected to weighing. As a result, it was found that the absorbency of the polymer product was 59 g per g of the polymer product for 0.9% saline solution and 610 g per g of the polymer product for purified water.

From the thus obtained powdery product, 50 parts by weight was weighed out. Then, 5 parts by weight of a 6% by weight aqueous solution of ammonium persulfate was sprayed onto the powdery product under agitation, thereby causing the aqueous solution to be absorbed in the surface portion of the powdery product. The resulting powdery product having the aqueous solution absorbed in substantially only the surface portion thereof was heated at 130° C. for 6 min in a drying chamber in which superheated steam was circulated. The ultimate powdery product [Sample B (present invention)] after the heating had a moisture content of 5% by weight. The absorbency of the Sample B was measured in the manner as described above. It was 560 g/g for purified water and 54 g/g for 0.9% saline solution. The hydrogel resulting from absorption of water had a pleasant non-sticky feel.

Moreover, the Samples A and B were subjected to a water (0.9% saline) absorption rate measuring test as indicated below.

Measurement of Water (0.9% saline) Absorption Rate

A 0.9% saline solution was put in a Petri dish having a bottom diameter of 15 cm so that the solution formed a layer of 1.5 cm in thickness. A cylindrical polyurethane sponge having a diameter of 3 cm and a height of 3 cm and having a bulk density of 25 kg/m$^3$ was put on the dish at its center in a manner such that the cylinder axis of the cylindrical sponge and the bottom plate of the dish crossed at a right angle. Further, a filter paper (type No. 2, manufactured and sold by Toyo Roshi K.K., Tokyo, Japan) was placed on the top of the cylindrical sponge so that the saline solution went up through the sponge to the upper surface of the filter paper by capillary action. 0.3 g of the pulverized product was placed on the upper surface of the filter paper for a period of 10 min. The resulting hydrogel was weighed to determine the amount of the saline solution absorbed.

The above-measured water (0.9% saline) absorption rate of Sample B (present invention) was 3 g/g-10 min, whereas that of Sample A (comparative) was only 10 g/g-10 min.

EXAMPLE 2

Substantially the same procedures as described in Example 1 were repeated except that a mixture of 4 parts by weight of a 7% by weight aqueous solution of potassium persulfate and 8 parts by weight of acetone was sprayed in place of the 6% by weight aqueous solution of ammonium persulfate, and that evaporation of the acetone was conducted before the heating for crosslinking of polymer molecules.

The ultimate powdery product [Sample C (present invention)] exhibited an absorbency of 550 g/g for purified water, an absorbency of 52 g/g for 0.9% saline solution and a water (0.9% saline) absorption rate of 38 g/g-10 min. The hydrogel resulting from absorption of water had a pleasant non-sticky feel.

EXAMPLE 3

A mixture prepared by adding 0.1 part by weight of N,N'-methylene-bisacrylamide and 5 parts by weight of methyl ethyl ketone to 5 parts by weight of a 4% by weight aqueous solution of ammonium persulfate was sprayed onto 50 parts by weight of the untreated powdery product (Sample A) as obtained in Example 1 under agitation. The resulting powdery product having the aqueous mixture absorbed in substantially only the surface portion thereof was subjected to an evaporation operation of the methyl ethyl ketone and heated at 120° C. for 10 min in a drying chamber in which superheated steam was circulated. The ultimate powdery product [Sample D (present invention)] after the heating had a moisture content of 6% by weight.

The ultimate powdery product (Sample D) exhibited an absorbency of 530 g/g for purified water, an absorbency of 51 g/g for 0.9% saline solution and a water (0.9% saline) absorption rate of 40 g/g-10 min. The hydrogel resulting from absorption of water had a pleasant non-sticky feel.

EXAMPLE 4

A commercially available water absorbent graft crosslinked polymer of starch and acrylic acid (comparative) [Sanwet IM (registered trade mark) manufactured and sold by Sanyo Chemical Industries, Ltd., Tokyo, Japan] exhibited an absorbency of 670 g/g for purified water, an absorbency of 64 g/g for 0.9% saline solution and a water (0.9% saline) absorption rate of 15 g/g-10 min.

A mixture of 4 parts by weight of a 7% by weight aqueous solution of potassium persulfate and 6 parts by weight of acetone was sprayed onto 50 parts by weight of the above-mentioned commercially available wet absorbent polymer under agitation. The resulting powdery product having the aqueous mixture absorbed into the surface portion thereof was subjected to an evaporation operation of the acetone, followed by heating in substantially the same manner as described in Example 1.

The ultimate powdery product [Sample E (present invention)] exhibited an absorbency of 590 g/g for purified water, an absorbency of 59 g/g for 0.9% saline solution and a water (0.9% saline) absorption rate of 37 g/g-10 min. The hydrogel resulting from absorption of water had a pleasant non-sticky feel.

What is claimed is:

1. A process for improving a water absorbent polyacrylic acid polymer with respect to absorption characteristics thereof which comprises the steps of:
    (1) contacting with the surface of a water absorbent polyacrylic acid polymer an aqueous solution containing a water soluble peroxide radical initiator, the weight ratio of the water in said aqueous solution to said polymer being from 0.01 to 0.5, thereby causing said polymer substantially only at its surface portion to have said solution absorbed therein; and
    (2) heating the resulting polymer with its surface portion having said solution absorbed therein at a temperature such that said initiator is decomposed but said polymer is not decomposed, thereby causing said polymer at its surface portion to undergo crosslinking by the action of said initiator while leaving the remaining core portion of said polymer substantially intact.

2. A process according to claim 1, wherein said weight ratio is in the range of from 0.02 to 0.3.

3. A process according to claim 2, wherein said weight ratio is in the range of from 0.02 to 0.2.

4. A process according to claim 3, wherein said weight ratio is in the range of from 0.03 to 0.1.

5. A process according to claim 1, wherein said initiator is at least one member selected from the group consisting of ammonium persulfate, sodium persulfate, potassium persulfate, hydrogen peroxide, oxalic acid peroxide, acetic acid peroxide and succinic acid peroxide.

6. A process according to claim 1, wherein said initiator is contained in said aqueous solution in an amount of from 0.01 to 10% by weight based on the polymer.

7. A process according to claim 6, wherein said initiator is contained in said aqueous solution in an amount of from 0.1 to 5% by weight based on the polymer.

8. A process according to claim 7, wherein said initiator is contained in said aqueous solution in an amount of from 0.2 to 2% by weight based on the polymer.

9. A process according to claim 1, wherein said aqueous solution further contains a crosslinking auxiliary.

10. A process according to claim 9, wherein said crosslinking auxiliary is a hydrophilic polyfunctional olefinically unsaturated compound.

11. A process according to claim 10, wherein said unsaturated compound is at least one member selected from the group consisting of N,N'-methylenebisacrylamide, ethylene glycol bis(meth)acrylate and polyethylene glycol bis(meth)acrylate.

12. A process according to claim 1, wherein said aqueous solution further contains a water miscible volatile organic solvent.

13. A process according to claim 12, wherein said aqueous solution contains said volatile organic solvent in an amount of from 0.5 to 10 parts by volume per part by volume of water.

14. A process according to claim 1, wherein said water absorbent polyacrylic acid polymer is at least one member selected from the group consisting of a crosslinked acrylic acid homopolymer, a crosslinked acrylic acid copolymer, a saponification product of a copolymer of vinyl acetate and an acrylic ester, a graft crosslinked polymer of starch and acrylic acid and a hydrolyzate of a graft polymer of starch and acrylonitrile.

15. A process according to claim 1, wherein said water absorbent polyacrylic acid polymer is a gel capable of absorbing from 300 to 1000 g of water per g of the gel.

16. A process according to claim 1, wherein said water absorbent polyacrylic acid polymer is in a particulate form, fibrous form or film form.

17. A process according to claim 16, wherein said polymer is in a particulate form and has an average particle diameter of from 10 to 3000 μm.

18. A process according to claim 17, wherein said polymer has an average particle diameter of from 50 to 1000 μm.

19. A process according to claim 18, wherein said polymer has an average particle diameter of from 100 to 500 μm.

20. A process according to claim 16, wherein said polymer is in a film form and has a film thickness of from 5 to 1000 μm.

21. A process according to claim 16, wherein said polymer is in a fibrous form and has a fiber diameter of from 5 to 1000 μm.

22. A process according to claim 1, wherein said contacting is performed by spraying said aqueous solution onto the surface of the water absorbent polyacrylic acid polymer.

23. A process according to claim 1, wherein said decomposition of the peroxide radical initiator is completed within 10 minutes.

24. A process according to claim 1, wherein said water absorbent polyacrylic acid polymer has carboxyl groups, from 60 to 90% by mole of which is in the form of an alkali metal salt.

25. A process according to claim 1, wherein said polymer with its surface portion having said aqueous solution absorbed therein is heated in an atmosphere of superheated steam.

26. An improved water absorbent polyacrylic acid polymer produced by a process of claim 1.

27. An improved water absorbent polyacrylic acid polymer produced by a process of claim 2.

28. An improved water absorbent polyacrylic acid polymer produced by a process of claim 3.

29. An improved water absorbent polyacrylic acid polymer produced by a process of claim 4.

30. An improved water absorbent polyacrylic acid polymer produced by a process of claim 5.

31. An improved water absorbent polyacrylic acid polymer produced by a process of claim 6.

32. An improved water absorbent polyacrylic acid polymer produced by a process of claim 7.

33. An improved water absorbent polyacrylic acid polymer produced by a process of claim 8.

34. An improved water absorbent polyacrylic acid polymer produced by a process of claim 9.

35. An improved water absorbent polyacrylic acid polymer produced by a process of claim 10.

36. An improved water absorbent polyacrylic acid polymer produced by a process of claim 11.

37. An improved water absorbent polyacrylic acid polymer produced by a process of claim 12.

38. An improved water absorbent polyacrylic acid polymer produced by a process of claim 13.

39. An improved water absorbent polyacrylic acid polymer produced by a process of claim 14.

40. An improved water absorbent polyacrylic acid polymer produced by a process of claim 15.

41. An improved water absorbent polyacrylic acid polymer produced by a process of claim 16.

42. An improved water absorbent polyacrylic acid polymer produced by a process of claim 17.

43. An improved water absorbent polyacrylic acid polymer produced by a process of claim 18.

44. An improved water absorbent polyacrylic acid polymer produced by a process of claim 19.

45. An improved water absorbent polyacrylic acid polymer produced by a process of claim 20.

46. An improved water absorbent polyacrylic acid polymer produced by a process of claim 21.

47. An improved water absorbent polyacrylic acid polymer produced by a process of claim 22.

48. An improved water absorbent polyacrylic acid polymer produced by a process of claim 23.

49. An improved water absorbent polyacrylic acid polymer produced by a process of claim 24.

50. An improved water absorbent polyacrylic acid polymer produced by a process of claim 25.

* * * * *